US011877118B2

(12) United States Patent
Macomber et al.

(10) Patent No.: US 11,877,118 B2
(45) **Date of Patent: *Jan. 16, 2024**

(54) MAGNET SYSTEM FOR WIRELESS EARBUDS AND CASE

(71) Applicant: Google LLC, Mountain View, CA (US)

(72) Inventors: Bryan Macomber, San Francisco, CA (US); Troy Edwards, Los Gatos, CA (US); Melissa Zucker, San Francisco, CA (US); Peter Michael Cazalet, Los Gatos, CA (US); Kevin Kurtz, San Jose, CA (US); Yao Ding, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,180

(22) Filed: Mar. 3, 2023

(65) Prior Publication Data

US 2023/0209245 A1 Jun. 29, 2023

Related U.S. Application Data

(63) Continuation of application No. 17/229,039, filed on Apr. 13, 2021, now Pat. No. 11,601,747.

(Continued)

(51) Int. Cl.
*H04R 1/10* (2006.01)
*H04R 1/02* (2006.01)

(52) U.S. Cl.
CPC ............. *H04R 1/1091* (2013.01); *H04R 1/02* (2013.01); *H04R 1/1016* (2013.01)

(58) Field of Classification Search
CPC ...... H04R 1/02; H04R 1/1016; H04R 1/1041; H04R 1/1025; H04R 2420/07;

(Continued)

(56) References Cited

U.S. PATENT DOCUMENTS 5,680,126 A 10/1997 Kikinis
10,866,290 B2 12/2020 Ding et al.

(Continued)

FOREIGN PATENT DOCUMENTS

CN 209845245 12/2019
DK 201970048 5/2019

(Continued)

OTHER PUBLICATIONS

"How do I update the firmware on my Jabra earbuds using Jabra Sound+?", Retrieved at: https://www.jabra.com/supportpages/jabra-elite-65t-iet-6500/100-99000002-02/faq/how-do-i-update-the-firmware-on-my-jabra-earbuds-using-jabra-soundplus—on Jul. 8, 2022, 6 pages.

(Continued)

*Primary Examiner* — Carolyn R Edwards
*Assistant Examiner* — Julie X Dang
(74) *Attorney, Agent, or Firm* — Colby Nipper PLLC

(57) ABSTRACT

The present disclosure provides a magnetic system within a case for an electronic accessory. The case may include a housing portion and a lid coupled to the housing portion. Within the housing portion may be a housing magnet. The housing magnet may be oriented such that the magnetic field of the housing magnet is oriented transverse to a longitudinal axis of the case. The housing magnet may have a size and strength to magnetically couple the electronic accessory within a cavity of the housing. A hinge magnet may be located along an axis of rotation of the lid with respect to the housing. The hinge magnet and housing magnet may magnetically interact to form a bistable magnetic hinge. Thus, the one housing magnet may be large enough and have a strong enough magnetic field to perform various functions.

22 Claims, 7 Drawing Sheets

Related U.S. Application Data

(60) Provisional application No. 63/014,837, filed on Apr. 24, 2020.

(58) Field of Classification Search
CPC ........ E05C 19/16; E05C 1/10; E05B 17/0033; H02J 7/0044; H01F 7/02
See application file for complete search history.

(56) References Cited

U.S. PATENT DOCUMENTS

| | | | | |
|---|---|---|---|---|
| 11,601,747 | B2 * | 3/2023 | Macomber | H04R 1/1091 |
| 2012/0005497 | A1 | 1/2012 | Tsukamoto et al. | |
| 2014/0087659 | A1 * | 3/2014 | Parkins | H01Q 7/06 455/41.1 |
| 2016/0057530 | A1 | 2/2016 | Anderson et al. | |
| 2017/0094399 | A1 * | 3/2017 | Chandramohan | H04R 5/033 |
| 2017/0238087 | A1 | 8/2017 | Chawan et al. | |
| 2018/0048987 | A1 | 2/2018 | Morris | |
| 2020/0107110 | A1 | 4/2020 | Ji et al. | |
| 2020/0310780 | A1 | 10/2020 | Chen et al. | |
| 2021/0152036 | A1 | 5/2021 | Sun et al. | |
| 2021/0337303 | A1 | 10/2021 | Macomber et al. | |

FOREIGN PATENT DOCUMENTS

| | | |
|---|---|---|
| EP | 3448057 | 2/2019 |
| WO | 2022055291 | 3/2022 |

OTHER PUBLICATIONS

"Non-Final Office Action", U.S. Appl. No. 17/229,039, dated Jun. 2, 2022, 17 pages.

"Notice of Allowance", U.S. Appl. No. 17/229,039, dated Nov. 7, 2022, 8 pages.

"Redmi Earbuds 2C Update Guide", Retrieved at: https://www.mi.com/in/service/support/redmiearbudsuserguide.html—on Jul. 8, 2022, 10 pages.

"International Search Report and Written Opinion", Application No. PCT/US2023/061378, dated Aug. 29, 2023, 12 pages.

* cited by examiner

MAGNET SYSTEM FOR WIRELESS EARBUDS AND CASE

CROSS-REFERENCE TO RELATED APPLICATIONS

This application is a continuation of and claims priority to U.S. Non-Provisional patent application Ser. No. 17/229,039, filed on Apr. 13, 2021, which in turn claims priority to U.S. Provisional Patent Application Ser. No. 63/014,837 filed Apr. 24, 2020, the disclosures of which are incorporated by reference herein in their entireties.

BACKGROUND

A case for housing wireless devices can be configured to perform various functions to support wireless devices, including charging the batteries of the wireless devices. The case may include magnets for holding the case closed and for holding the wireless devices inside the case. Typically, the case may use a plurality of magnets to perform these functions. For example, in cases where the wireless device is a pair of earbuds, there may be separate magnets to hold each of the earbuds within the case. There may also be additional magnets to assist in keeping the case closed. Having all these magnets requires a large case to make room for the numerous magnets.

Additionally, the magnetic attraction between the wireless device and the magnets within the case may be strong such that it makes removal of the wireless device challenging. Alternatively, the magnetic attraction between the wireless device and the magnets within the case may be too weak to properly seat the wireless device for charging and, therefore, the case must be completely closed to ensure the wireless device is in proper contact with the case for charging.

Some cases and wireless devices have exposed magnets to overcome these issues, but exposed magnets are not aesthetically pleasing. Further, exposed magnets require additional manufacturing time and costs, including applying proper coatings to the exposed magnets to ensure there is no corrosion over time.

BRIEF SUMMARY

The present disclosure provides a magnet system for an electronic accessory, or wireless device, and a case for housing the electronic accessory. The case may include a housing including at least one cavity for receiving the electronic accessory and a lid that can move between a closed configuration and an open configuration. Within the housing may be a single housing magnet that is large enough in size to magnetically attract the electronic accessory, thereby properly seating the electronic accessory within the cavity. The housing magnet may be oriented such that the housing magnetic field radiates, or extends, transverse to a longitudinal axis of the case.

The electronic accessory may be, for example, a pair of wireless earbuds and the case may be a charging case for the earbuds. The earbuds may include magnets or magnetic components, such as a basement magnet, a basement MIM part, a speaker magnet, and a speaker yoke. The orientation of the housing magnetic field magnetically attracts each of the earbuds, due at least to the magnets within each of the earbuds. Thus, only a single housing magnet may be necessary to magnetically couple or properly seat both earbuds. The magnetic force or attraction between the housing magnet and the magnets within each of the earbuds may assist in aligning the charging contacts within the case and a plurality of charging pins on each of the earbuds such that the magnetic attraction may properly seat each of the earbuds for charging.

The housing magnet, and therefore the housing magnetic field, may also interact with a hinge magnet located at or near the axis of rotation for the lid. The magnetic interaction between the housing magnet and the hinge magnet may create a spring like motion, or a bistable magnetic field hinge, to assist in opening and closing the lid. Thus, there is no need for a spring or other mechanical hinge mechanism where the lid and housing are coupled.

One aspect of this disclosure provides for a case for an electronic accessory comprising a housing having a longitudinal axis and a lid coupled to a portion of the housing. The housing may include at least one cavity for receiving the electronic accessory. The lid may be configured to move between a closed configuration and an open configuration. A housing magnet may be located within the housing. The housing magnet may have a first pole and a housing magnetic field extending transverse to the longitudinal axis of the housing, the first pole having a first polarity. A hinge magnet may be located at an axis of rotation for the lid, the hinge magnet may have a second pole having a second polarity, the second polarity being the same as the first polarity, the hinge magnet may be oriented such that the second pole of the hinge magnet faces the first pole of the housing magnet when the lid is in a position between the open configuration and the closed configuration. The housing magnetic field may exert a first magnetic force on the electronic accessory to magnetically couple the electronic accessory with the case. The housing magnet and the hinge magnet may interact to create a magnetic hinge for opening and closing the lid of the case.

The magnetic hinge may be a bistable magnetic field hinge such that when the lid is in a position between the open and closed configuration the housing magnet repels the hinge magnet. The position between the open and closed configuration may be a midpoint between the open configuration and the closed configuration. The case may further comprise a house shunt coupled to the house magnet, the house shunt configured to shield the house magnetic field from extending substantially beyond the case.

The case may further comprise a magnetic sensor, a lid magnet having a lid magnetic shield, and a nest magnet having a nest magnetic field, wherein the magnetic sensor detects the house magnetic field and the nest magnetic field when the lid is in an open configuration such that the magnetic sensor has a first saturation, and wherein the magnetic sensor detects the lid magnetic field when the lid is in the closed configuration such that the hall effect sensor has a second saturation different than the first saturation. The lid magnet may be located within the lid and the nest magnet may be located in the housing on a side opposite the hinge magnet, the lid magnet and nest magnet may be aligned along a second longitudinal axis. The lid magnet and the nest magnet may be attracted to each other when the lid is in the closed configuration.

The case may comprise a plurality of shields positioned within the house and a plurality of shunts coupled to one or more magnets, the plurality of shields and the plurality of shunts configured to prevent a total magnetic field from extending substantially beyond the case. The plurality of shields and the plurality of shunts may be configured to prevent the total magnetic field from saturating a wireless charging coil located within the case. Each of the plurality of shields and the plurality of shunts may be made of ferrous metal.

Another aspect of the disclosure provides for a system comprising a pair of earbuds, each earbud including a basement metal injection molding ("MIM") part and a basement magnet and a case. The case may include a housing having a longitudinal axis, the housing including at least one cavity for receiving the pair of earbuds, a lid coupled to a portion of the housing, the lid configured to move between a closed configuration in which it mates with the housing and an open configuration, a housing magnet located within a housing, the housing magnet having a first pole and a housing magnetic field extending transverse to the longitudinal axis of the housing, the first pole having a first polarity, a hinge magnet located at an axis of rotation for the lid, the hinge magnet having a second pole having a second polarity, the second polarity being the same as the first polarity, the hinge magnet being oriented such that the second pole of the hinge magnet faces the first pole of the housing magnet, wherein the housing magnetic field exerts a first magnetic force on each of the basement MIM part and the basement magnets to magnetically couple the pair of earbuds with the case, and wherein the housing magnet and the hinge magnet interact to create a magnetic hinge for opening and closing the lid of the case.

DETAILED DESCRIPTION

The technology disclosed may generally relate to a case for housing an electronic accessory. As mentioned above, the case may be configured to support functions of the electronic accessory, such as charging the electronic accessory. However, to ensure the electronic accessory is properly seated within the case, at least one magnet may be used. Further, the case may use magnets to assist in opening and closing the case. Thus, not only is there a plurality of magnets to seat the electronic accessory, there may be a plurality of magnets to open and close the case. Having numerous magnets may increase the total magnetic field of the case such that the strength of the magnetic field outside the case may become damaging to other devices that use magnets, such as credit cards, hotel keys, vehicle keys, etc. Thus, the case may include additional materials, such as ferrous metal, to prevent or substantially prevent the magnetic field of the case from extending beyond the case. To avoid having a cumbersome case, a single housing magnet may be used to perform various functions that were previously performed by a plurality of magnets.

The housing magnet may be located within a housing of the case. The housing magnet may be sized and shaped such that the magnetic field produced by the housing magnet, the housing magnetic field, may be strong enough to magnetically attract the electronic accessory and may also be used to assist in opening and closing the case. Moreover, the housing magnet may be oriented such that the housing magnetic field substantially extends or radiates in a plane transverse to a longitudinal axis of the case. The housing magnetic field may exert a magnet force on the electronic accessory to magnetically couple the electronic accessory with the case. Coupling the electronic accessory to the case may ensure that the electronic accessory is properly seated in the case to be charged.

The case may have a lid that is coupled to the housing. For example, the lid may be coupled to the case using a butt hinge, barrel hinge, pivot hinge, etc. The hinge may merely keep the lid coupled to the housing but may not include any mechanical components, such as a spring, to assist in the opening and closing of the hinge. Thus, the case may include a hinge magnet located at or near the axis of rotation of the lid. The hinge magnet may be oriented such that when the lid is in an open or closed configuration, the hinge magnet is repelled by the housing magnet. Thus, the housing magnet and hinge magnet may create a bi-stable magnetic field hinge for opening and closing the lid of the case.

Figure 1A:
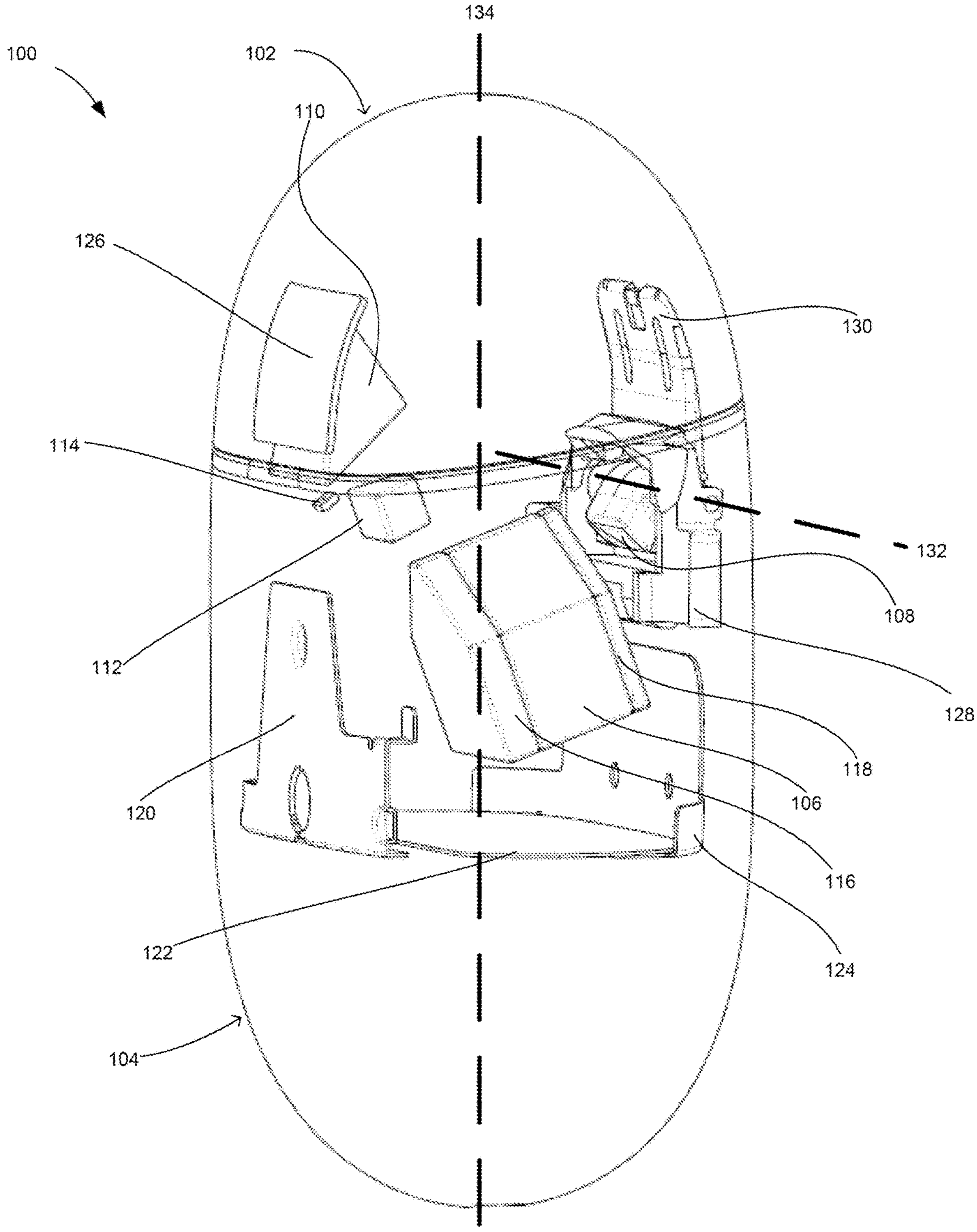
FIG. 1A is a perspective view of an example case for an electronic accessory in a closed configuration according to aspects of the disclosure.
Figure 1B:
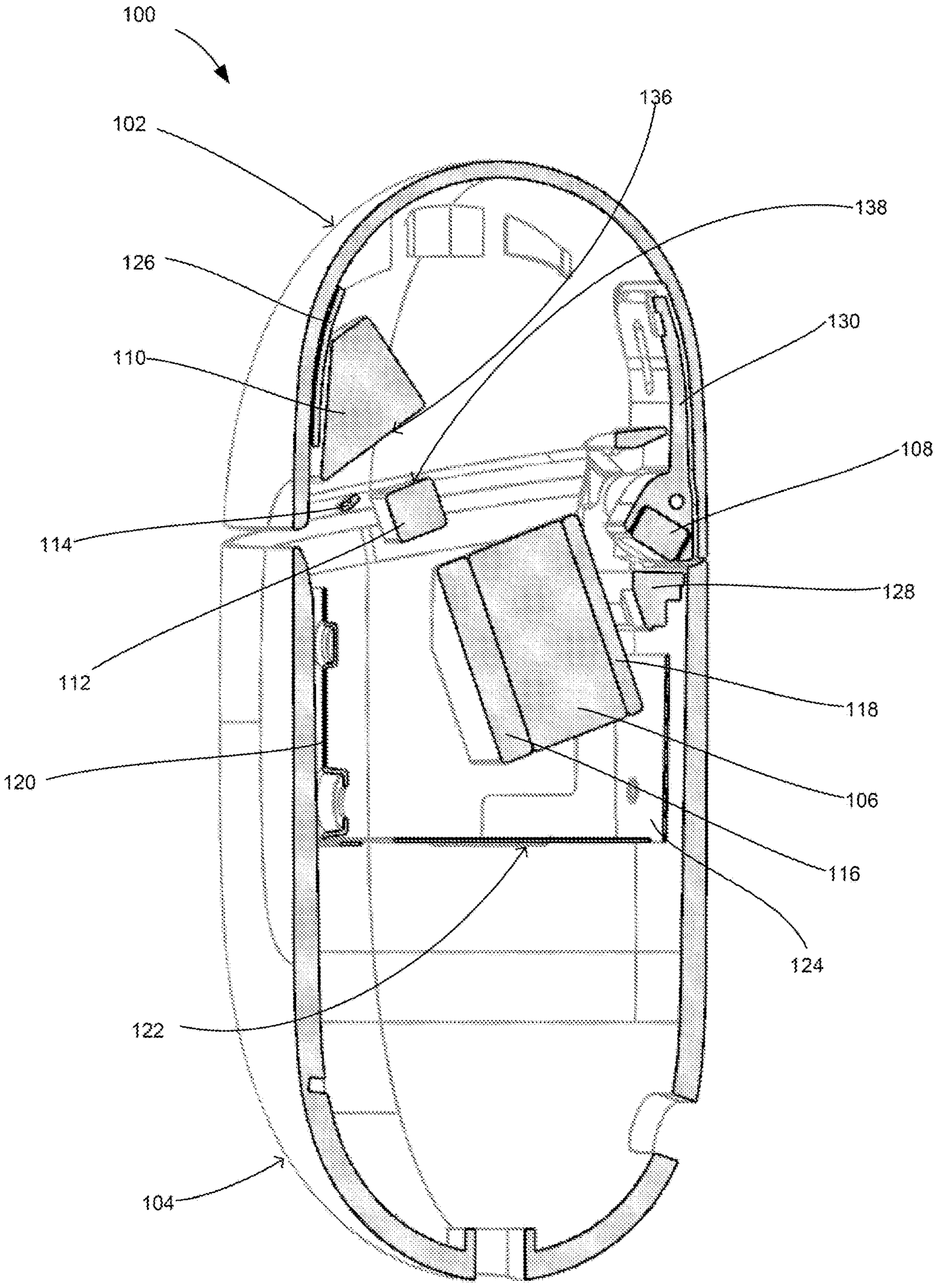
FIG. 1B is a cross section view of the example case of FIG. 1A according to aspects of the disclosure.

FIGS. 1A and 1B illustrate an example case 100 for an electronic accessory in which the features described herein may be implemented. FIG. 1A illustrates a perspective view of case 100. Case 100, as shown in FIG. 1A, is see-through to allow for viewing of the internal component of case 100. FIG. 1B illustrates a cross-sectional view of case 100 and its internal components. As shown in FIGS. 1A and 1B, case 100 may be in a closed configuration.

Case 100 may include a lid 102 and a housing 104. Housing 104 may include a cavity for receiving an electronic accessory. Housing 104 may also include housing magnet 106, nest magnet 112, and magnetic sensor 114 as well as a plurality of shunts and shields. Lid 102 may include lid magnet 110 and lid shield 126. Lid 102 may be coupled to housing 104 via hinge plate 130 and hinge cage 128. In particular, hinge plate 130 may be coupled to lid 102 and hinge cage 128 may be coupled to housing 104. Hinge plate 130 and hinge case 128 may be coupled using a pin. According to some examples, hinge plate 130 and hinge case 128 may create a butt hinge, a barrel hinge, etc. Hinge magnet 108 may be coupled to hinge plate 130 and/or hinge cage 128 at, along, or near the axis of rotation 132. According to some examples, hinge magnet 108 may be coupled to hinge plate 130 and/or hinge cage 128 in a rotatable fashion such that as lid 102 moves from an open configuration to a closed configuration and vice versa, hinge magnet 108 may rotate.

In general, each magnet within case 100 may have a first and second pole, such as the North and South pole. The magnetic field associated with each magnet may start at the first pole, such as the North pole, and loop around to the second pole, such as the South pole. The magnetic field may extend through the magnet itself, such that the magnetic field is a plurality of continuous loops. The strongest part of the magnetic field may be closest to a pole of the magnet, such as the North or South pole. The strength of the magnetic field may be weaker as the distance from the pole increases. Magnets may be attracted to each other when two opposing poles, such as a North pole from a first magnet and a South pole from a second magnet, are near each other. An attraction between magnets may pull or force the two magnets to be together. Magnets may be repelled from each other when two like poles, such as a North pole from a first magnet and a North pole from a second magnet, are near each other. A repulsion between magnets may push or force the two magnets to be apart.

The magnetic fields created by each of the magnets may be redirected or dispersed using ferrous metals. The ferrous metals may be a special steel with a high saturation point. According to some examples, the ferrous metals may be carbon steel, stainless steel, cast iron, wrought iron, etc. The plurality of shunts and shields may be used to redirect the magnetic fields of each magnet. In some examples, the shunts and shields may be used to reshape the magnetic fields to optimize the magnetic force in a certain direction. For example, the shunts and shields may be used to redirect, or keep, the magnetic field, or flux, within case 100. Shunts may be coupled to the magnets and shields may be coupled to the housing or lid. In particular, the shunts and shields may be placed based on the position of the magnets within case 100. The shunts and shields may be placed to redirect the magnetic field to remain substantially within case 100. In some examples the shunts and shields prevent the magnetic field from saturating a ferrite sheet that backs up a wireless charging coil within case 100. The shields and shunts may keep the magnetic field from saturating the ferrite sheet on an accompanying charging mat that is being used to charge case 100. Further, according to some examples, the shunts and shields may increase the magnetic attraction between various parts of case 100 as well as between case 100 and an electronic accessory.

Housing magnet 106 may be sized and shaped to perform various functions within case 100. For example, housing magnet 106 may have a cubic base and a triangular prism extending from one face of the cube base. However, housing magnet 106 may have a variety of other shapes, such as a rectangular prism, cylindrical, a pyramid, etc. Therefore, the shape of housing magnet 106 as shown in not meant to be limiting but is merely one example. Housing magnet 106 may be oriented such that a housing magnetic field extends, or radiates, traverse to a longitudinal axis 134 of case 100.

According to some examples, the housing magnetic field may be damaging or overpowering to elements within case 100 as well as to other devices outside of case 100. Thus, housing magnet 106 may have a plurality of house shunts, such as shunts 116, 118, coupled to housing magnet 106. Shunts 116, 118 may be made of a ferrous metal, such as alloy steel, carbon steel, cast iron, wrought iron, etc. Shunts 116, 118 may be coupled to housing magnet 106 to redirect the magnetic field, or flux, of housing magnet 106. In particular, shunts 116, 118 may be placed to redirect the housing magnetic field of housing magnet 106 to remain within case 100. Further, printed circuit board ("PCB") shield 120, bottom shield 122, and coil shield 124 may be located adjacent, nearby, and/or below housing magnet 106. PCB shield 120, bottom shield 122, and coil shield 124 may protect various components, such as the PCB and coils, from the housing magnetic field. Additionally or alternatively, PCB shield 120, bottom shield 122, and coil shield 124 may be used to redirect the housing magnetic field from extending beyond case 100.

Housing magnet 106 may interact with other magnets within case 100 to perform various functions, such as seating the electronic accessory, assisting in opening and closing the lid 102 of case 100, etc. For example, housing magnet 106 may be magnetically attracted to the electronic accessory. Housing magnet 106 may exert a magnetic force on the magnets within the electronic accessory such that housing magnet 106 pulls the electronic accessory into the cavity. According to some examples, the direction of the magnetic force on electronic accessory may align the charging contacts of case 100 with the charging contacts on the electronic accessory, thereby ensuring that the electronic accessory is properly seated within case 100.

Housing magnet 106 may be, at times, magnetically attracted to hinge magnet 108 and may also be, at times, magnetically repelled from hinge magnet 108. For example, the magnetic interaction between housing magnet 106 and hinge magnet 108 may create a magnetic hinge between lid 102 and housing 104. In particular, the hinge created by the coupling of hinge plate 130 and hinge cage 128 may not include any springs or other mechanical features to assist in the opening and closing of lid 102. Thus, the magnetic attraction and repulsion between housing magnet 106 and hinge magnet 108 may assist in the opening and closing of lid 102. According to some examples, the magnetic attraction and repulsion between housing magnet 106 and hinge magnet 108 may assist in keeping the lid 102 in an open or closed configuration. The magnetic interaction between housing magnet 106 and hinge magnet 108 may create a bistable magnetic field hinge.

According to one example, when lid 102 is in the closed configuration, housing magnet 106 and hinge magnet 108 may be magnetically attracted, such that the magnetic attraction assists in keeping lid 102 in the closed configuration. For example, hinge magnet 108 may be oriented such that a first pole of hinge magnet 108 is of opposite polarity as the nearest pole of housing magnet 106. As lid 102 is opened, such that it is between the closed configuration and a midpoint between the closed configuration and the open configuration, the magnetic attraction between housing magnet 106 and hinge magnet 108 may lessen or weaken. The magnetic attraction may weaken due to the distance between the opposite poles of the housing magnet 106 and hinge magnet 108. Additionally or alternatively, the magnetic attraction between housing magnet 106 and hinge magnet 108 may weaken as the lid 102 transitions to an open configuration because hinge magnet 108 may rotate as lid 102 rotates around axis of rotation 132. In particular, hinge magnet 108 may rotate such that a pole, having a second polarity opposite the first, is becoming closer to housing magnet 106.

In another example, when lid 102 is in the closed configuration, housing magnet 106 and hinge magnet 108 may be magnetically repelled, such that the magnetic repulsion assists in keeping lid 102 in the closed configuration. For example, hinge magnet 108 may be oriented such that a first pole of hinge magnet 108 is the same polarity as the nearest pole of housing magnet 106. As lid 102 is opened, such that it is between the closed configuration and a midpoint between the closed configuration and the open configuration, the magnetic repulsion between housing magnet 106 and hinge magnet 108 may increase due to the distance between housing magnet 106 and hinge magnet 108 decreasing. When lid 102 is in the open configuration, housing magnet 106 and hinge magnet 108 may be magnetically repelled, such that the magnetic repulsion assists in keeping lid 102 in the open configuration.

When lid 102 is between the closed configuration and open configuration, such as the midpoint between the closed configuration and the open configuration, hinge magnet 108 may change its orientation such that housing magnet 106 and hinge magnet 108 may repel one another. The change in orientation may be due to the rotation of hinge magnet 108 as lid 102 opens. Magnetic repulsion may occur when like poles of each magnet are near each other. Thus, the second pole of hinge magnet 108 may now be closest to housing magnet 106. The second pole of hinge magnet 108 may have the same polarity as the nearest pole of housing magnet 106 and, therefore, hinge magnet 108 and housing magnet 106 may repel each other.

As lid 102 continues to open past the midpoint between the closed configuration and the open configuration, hinge magnet 108 may continue to change its orientation such that the housing magnet 106 and hinge magnet 108 magnetically attract each other. For example, the rotation of hinge magnet 108 may return the first pole of hinge magnet 108 to being closest to housing magnet 106 when lid 102 is in the open configuration. Thus, the magnetic attraction between housing magnet 106 and hinge magnet 108 may assist in keeping lid 102 in an open configuration.

Housing 104 may further include a nest magnet 112. Nest magnet 112 may be located opposite hinge magnet 108. According to some examples, nest magnet 112 may be aligned along a second longitudinal axis with lid magnet 110. Lid magnet 110 and nest magnet 112 may interact, or attract one another, to keep case 100 closed. This way, for example, if the case is dropped, the contents inside the case would not fall out. For example, lid magnet 110 and nest magnet 112 may be magnetically attracted to each other such that nest magnet 112 pulls the lids magnet 110 towards nest magnet 112. According to some examples, lid magnet 110 and nest magnet 112 may be configured such that, when case 100 is closed, a pole 136 of lid magnet 110 with a first polarity is facing a pole 138 of nest magnet 112 with a second polarity. The first polarity and the second polarity may be opposite, such that pole 136 and pole 138 attract. For example, the first polarity may be North and the second polarity may be South. Lid magnet 110 and nest magnet 112 may not touch but, rather, when lid 102 is in a closed configuration, lid magnet 110 and nest magnet 112 come within a predetermined distance with each other. For example, the predetermined distance may be a few millimeters.

Case 100 may include a magnetic sensor, or magnetic sensing device, 114. The magnetic sensor 114 may be configured to have low power consumption. For instance, one or more Hall Effect sensors may be selected as the magnetic sensor 114. For example, a Hall Effect sensor may require only 1.5 μA to operate. The magnetic sensor 114 may be configured to be durable. For instance, a Hall Effect sensor may have minimum aging effects, such as having little or minimal sensitivity variations even after being used for an extended period of time. Further, the magnetic sensor 114 may be positioned inside case 100 such that the magnetic sensor 114 has no exposed parts, which may further protect the magnetic sensor 114 from damage. For example, the magnetic sensor 114 may be positioned inside the space enclosed by the housing 104 and lid 102 of case 100. In addition, such a concealed design may improve appearance of the case 100.

The magnetic sensor 114 may be configured to determine whether lid 102 is in an open configuration or a closed configuration based on detection of magnetic field. For example, the magnetic sensor 114 may determine that lid 102 is in the closed configuration when magnetic sensor 114 detects a magnetic field in a first polarity, and may determine that lid 100 is in the open configuration when magnetic sensor 114 detects a magnetic field in a second polarity. For example, the magnetic sensor 114 may be a unipolar Hall Effect sensor. For another example, the magnetic sensor 114 may be configured to include two unipolar Hall Effect sensors. A unipolar Hall Effect sensor responds to magnetic field of a single polarity (such as either North or South).

The magnetic sensor 114 may detect the polarities of the magnetic fields from the lid magnet 110 and the nest magnet 112. For example, when lid 102 is in the closed configuration, magnetic sensor 114 may detect the magnetic field of the lid magnet 110, nest magnet 112, and housing magnet 106. Thus, magnetic sensor 114 may detect a first polarity when lid 102 is in a closed configuration. When lid 102 is in an open configuration, magnetic sensor 114 may detect the magnetic fields of nest magnet 112 and housing magnet 106. When lid 102 is in the open configuration, lid magnet 110 may be far enough away from magnetic sensor 114 that magnetic sensor 114 does not detect the magnetic field of lid magnet 110. Thus, magnetic sensor 114 may detect a second polarity when lid 102 is in an open configuration. By detecting the different polarities, magnetic sensor 114 may determine when lid 102 is in the open or closed configuration.

Case 100 may include additional components supporting or augmenting various functions of the electronic accessory. The additional components may be housed inside the space enclosed by housing 104 and lid 102. For instance, case 100 may include charging circuitry, which may be configured to deliver a charge to the batteries of the electronic accessory. For example, the charging circuitry may include a battery. In some examples, case 100 may include speaker circuitry for broadcasting audio received by the electronic accessory. For example, speakers may be used for operating case 100 as a wireless speaker to play music, or to emit audio for translated speech, etc. Additionally or alternatively, case 100 may further include one or more transceivers (not shown) for communicating with transceivers of the electronic accessory. Case 100 may include one or more processors for controlling the charging circuitry, the speaker circuitry, the one or more transceivers, and/or other component of case 100.

Figure 2:
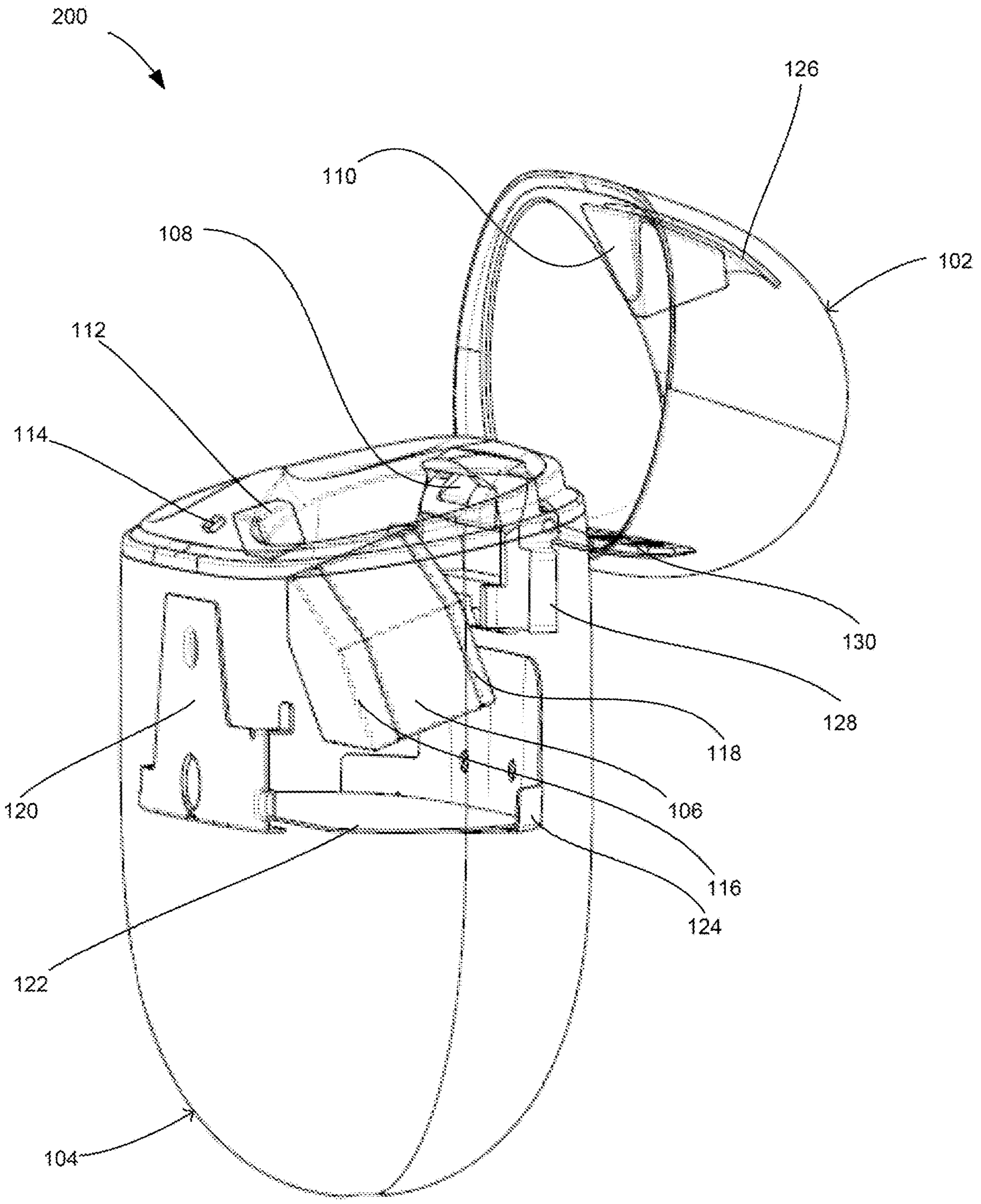
FIG. 2 is a perspective view of an example case for an electronic accessory in an open configuration according to aspects of the disclosure.

FIG. 2 illustrates a case for receiving an electronic accessory with the lid in an open configuration. As described above, the case may include a housing and a lid. The lid may be coupled to the housing using a hinge or a joint that allows the lid to rotate around an axis. According to some examples, the hinge may use magnets to assist in the rotation of the lid. For example, there may be a system of magnets that assist a user in opening and closing the lid. The assistance may be based on the attraction and repulsion force between each of the magnets within the system of magnets.

As shown in FIG. 2, lid 102 of case 200 is in an open configuration. As discussed herein, hinge magnet 108 may be magnetically attracted to or magnetically repelled from housing magnet 106 depending on the configuration of lid 102. According to some examples, hinge magnet 108 may be repelled from housing magnet 106 regardless of whether lid 102 is in an open configuration or a closed configuration. Rather, the inertia of lid 102 opening or closing may bring or position lid 102 in a stable, or bi-stable, point. In some examples, the stable point is half-way between the closed configuration and the open configuration. In other examples, the stable point is closer to the closed configuration or closer to the open configuration. Once lid 102 clears, or passes, the bi-stable point, lid 102 will continue to rotate to the open or closed configuration. Thus, the magnetic repulsion between hinge magnet 108 and housing magnet 106 may assist in keeping 102 in the open or closed configuration.

In another example, when lid 102 is in a closed configuration, hinge magnet 108 may be magnetically attracted to housing magnet 106. This may assist lid magnet 110 and nest magnet 112 in keeping lid 102 in a closed configuration. As lid 102 is moved from a closed configuration, the magnetic attraction between housing magnet 106 and hinge magnet 108 may lessen. In particular, as lid 102 approaches and/or reaches the half-open configuration, hinge magnet 108 may rotate such that hinge magnet 108 and housing magnet 106 magnetically repel each other. The rotation of hinge magnet 108 may rotate the polarity of hinge magnet 108. As lid 102 approaches the open configuration, as shown, hinge magnet 108 may continue to rotate such that hinge magnet 108 and housing magnet 106 magnetically attract each other. When lid 102 is in the open configuration, the magnetic attraction between hinge magnet 108 and housing magnet 106 may assist in keeping lid 102 in the open configuration.

Additionally or alternatively, when lid 102 is in the open configuration, lid magnet 110 may be at a maximum distance from nest magnet 112. The separation of lid magnet 110 and nest magnet 112 as the lid 102 transitions from a closed configuration to the open configuration may change the polarity of the magnetic field at magnetic sensor 114. The change in polarity of the magnetic field may be detected by magnetic sensor 114.

According to some examples, when lid 102 is in a closed configuration, magnetic sensor 114 may be saturated by a first magnetic field. The first magnetic field may include, for example, the magnetic field of lid magnet 110 and nest magnet 112. When lid 102 is in the open configuration, magnetic sensors may be saturated by a second magnetic field. The second magnetic field may be less than the first magnetic field. For example, the second magnetic field may include the magnetic field of nest magnet 112 but only some or none of the magnetic field of lid magnet 110 due to the distance between lid magnet 110 and magnetic sensor 114. Magnetic sensor 114 may detect the change in saturation of the magnetic field.

Figure 3B:
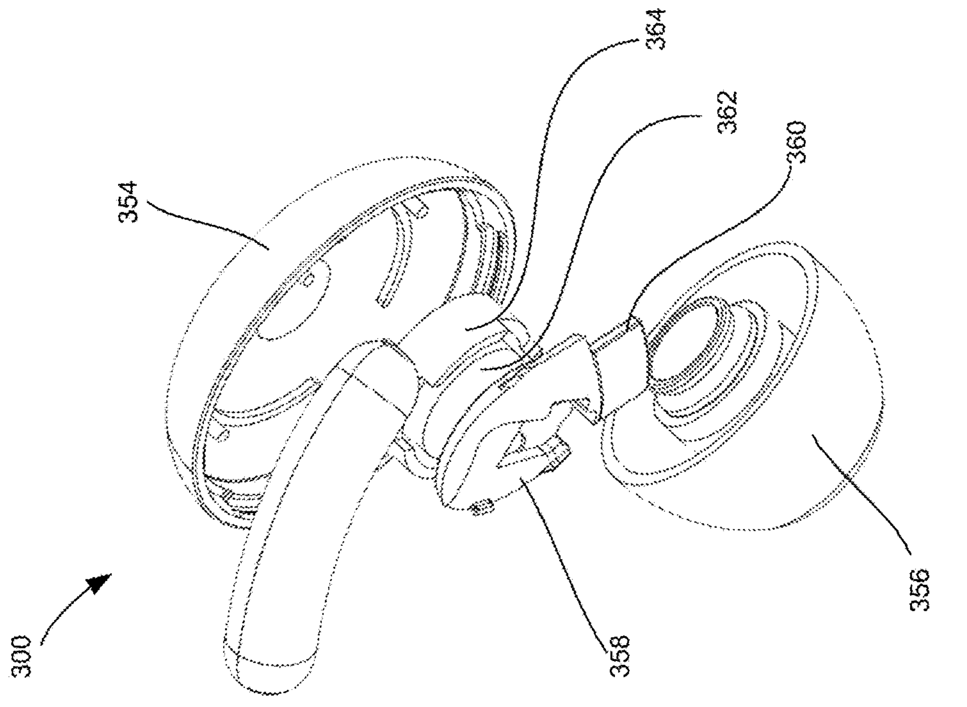
FIG. 3B is another perspective view of the electronic accessory of FIG. 3A according to aspects of the disclosure.
Figure 3A:
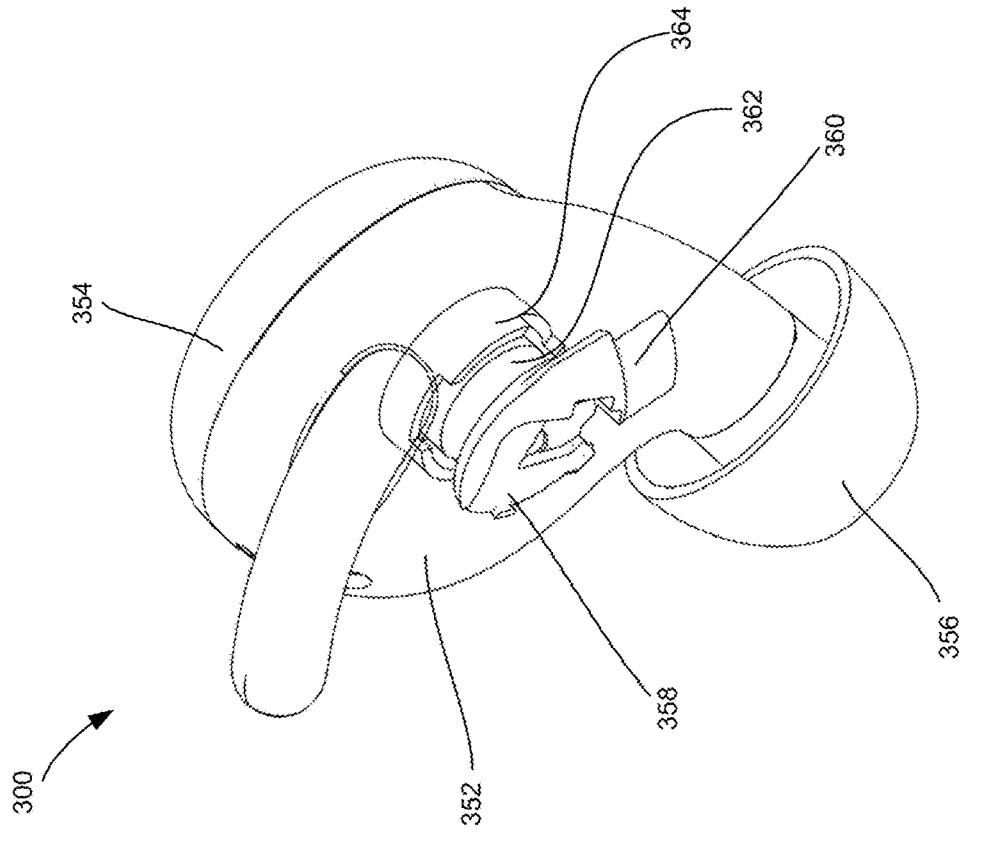
FIG. 3A is a perspective view of an example electronic accessory according to aspects of the disclosure.

FIGS. 3A and 3B illustrate an electronic accessory. As shown, the electronic accessory may be a pair of earbuds. FIGS. 3A and 3B illustrate one earbud 300 of the pair of earbuds. FIG. 3A is a perspective view in which the casing of earbud 300 is see-through to show the internal components of earbud 300. FIG. 3B is a perspective view of the internal components of earbud 300 with housing 352 removed.

Earbud 300 may include an outer surface 354, casing 352, and ear insert 356. Outer surface 354 and casing 352, when coupled together, may form a cavity for the internal components of earbud 300. For example, earbud 300 may include a basement magnet 360, basement metal injection molding ("MIM") part 358, a speaker magnet 362 and a speaker yoke 364.

Basement magnet 360 may have a polarity that is attracted to housing magnet 106 when earbud 300 is within case 100. For example, housing magnet 106 may have a first polarity and basement magnet 360 may have a second polarity. The second polarity may be opposite the first polarity. Due to the opposite polarities of housing magnet 106 and basement magnet 360, housing magnet 106 and basement magnet 360 may be attracted to one another. Thus, housing magnet 106 may exert a force on basement magnet 360 to properly seat earbud 300 within case 100.

Basement magnet 360 may be surrounded by basement MIM part 358. According to some examples, the basement MIM part 358 may have a polarity opposite the polarity of the housing magnet 106. Thus the basement MIM part 358 may be magnetically attracted to the housing magnet 106. The magnetic attraction between basement MIM part 358 and housing magnet 106 may assist in in properly seating earbud 300 within case 100.

According to some examples, basement MIM part 358 may be made of a ferrous metal. The size, shape, and positioning of basement MIM part 358 may redirect the magnetic field of basement magnet 360. For example, basement MIM part 358 may retain or redirect the magnetic field of basement magnet 360 to within earbud 300. Additionally or alternatively, basement MIM part 358 may redirect the magnetic field of basement magnet 360 to prevent the magnetic field of basement magnet 360 from interfering with other components within earbud 300, case 100, or another device nearby. In some examples, the basement MIM part 358 may reshape the magnetic field to result in a greater magnetic attraction between housing magnet 106 and earbud 300.

Speaker magnet 362 may have a polarity that is attracted to housing magnet 106. Thus, the magnetic attraction between speaker magnet 362 and housing magnet 106 may assist in magnetically coupling earbud 300 to case 100. Speaker magnet 362 may be surrounded or coupled to a speaker yoke 364. The speaker yoke 364 may be a ferrous cup. The speaker yoke 364, as a ferrous cup, may redirect the magnetic field of the speaker magnet 362 to prevent the magnetic field of speaker magnet 362 from interfering with other components within earbud 300, case 100, or another device nearby.

Figure 4:
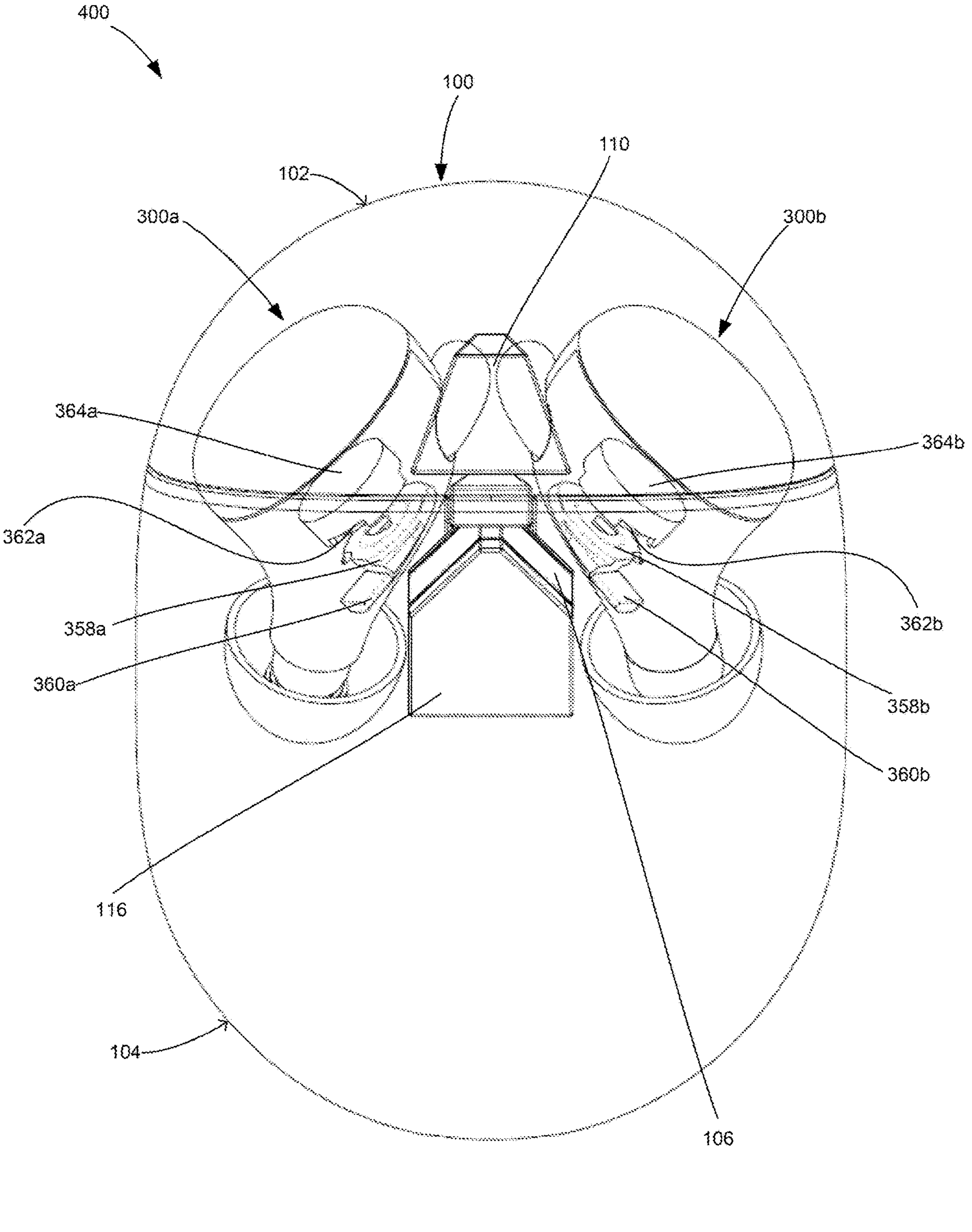
FIG. 4 is a perspective view of an example electronic accessory within an example case according to aspects of the disclosure.

FIG. 4 illustrates a system of a case 100 and an electronic accessory 300*a*, 300*b*. In particular, the case 100 may receive the electronic accessory 300*a*, 300*b*. The case may include one or more magnets for various functions associated with the case. For example, the case may include a large magnet, such as a housing magnet, positioned near the electronic accessory. The housing magnet may have a polarity that is opposite the polarity of the electronic accessory. Thus, the housing magnet may be magnetically attracted to the electronic accessory. The magnetic attraction between the housing magnet and the electronic accessory may assist in properly seating, or coupling, the electronic accessory within a cavity of the case.

The case may further include a hinge coupling the lid of the case to the housing. The hinge may include a magnet, such as a hinge magnet. The hinge magnet may be oriented such that at times the hinge magnet is magnetically attracted to the housing magnet and at other times the hinge magnet is magnetically repelled by the housing magnet. Thus, the magnetic interactions between the hinge magnet and the housing magnet may assist in keeping the lid of the case in an open or closed configuration without the need for spring or additional mechanical features. According to some examples, the hinge magnet may be oriented such that the hinge magnet is repelled by the housing magnet regardless of whether the lid is in the open configuration or the closed configuration.

System 400 may include a case, such as case 100 described above. The case may receive, or house, a left earbud 300*a* and a right earbud 300*b*. As described herein, the case may include housing 104 and lid 102. Housing 104 may include a cavity for receiving the left and right earbuds 300*a*, 300*b*. The left and rights earbuds 300*a*, 300*b* may be magnetically coupled to housing 104 when within the cavity of housing 104.

Left earbud 300*a* and right earbud 300*b* are located on opposing sides of housing magnet 106. In particular, left earbud 300*a* and right earbud 300*b* are located adjacent to sides of housing magnet 106 that are not covered by shunts, such as shunt 116 and shunt 118 described above.

As shown in FIG. 4, each of the left and right earbuds 300*a*, 300*b* have a basement magnet 360*a*, 360*b*, basement MIM part 358*a*, 358*b*, speaker magnet 362*a*, 362*b*, and speaker yoke 364*a*, 364*b*. Basement magnets 360*a*, 360*b* and speaker magnets 362*a*, 362*b* have a polarity such that they are magnetically attracted to housing magnet 106. For example, housing magnet 106 may pull down, or exert a force on, basement magnets 360*a*, 360*b* and speaker magnets 362*a*, 362*b* of the left and right earbuds 300*a*, 300*b* to properly seat of the left and right earbuds 300*a*, 300*b* within the cavity of housing 104. Thus, the size and orientation of housing magnet 106 may be capable of seating both the left and right earbuds 300*a*, 300*b* within the cavity of housing 104. According to some examples, one (1) Newton ("N") of magnetic force between housing magnet 106 and basement magnets 360*a*, 360*b* and speaker magnets 362*a*, 362*b* may be required to properly seat the left and right earbuds 300*a*, 300*b* in case 100. In some examples, 1.3N of magnetic force between housing magnet 106 and basement magnets 360*a*, 360*b* and speaker magnets 362*a*, 362*b* may be required to properly seat the left and right earbuds 300*a*, 300*b* in case 100. However, the magnetic force may be 0.85N, 0.93N, 1.05N, 1.22N, etc. Thus, 1N and 1.3N of magnetic force housing magnet 106 and basement magnets 360*a*, 360*b* and speaker magnets 362*a*, 362*b* are merely some examples and are not meant to be limiting. The magnetic force coupling left and right earbuds 300*a*, 300*b* to case 100 may have to be higher than the compression force of the charging points or pins between left and right earbuds 300*a*, 300*b* and case 100. Thus, the magnetic force between housing magnet 106 and basement magnets 360*a*, 360*b* and speaker magnets 362*a*, 362*b* may vary based on the size, shape, location, etc. of the charging points on left and right earbuds 300*a*, 300*b* and case 100.

Proper seating of the left and right earbuds 300*a*, 300*b* may be required to ensure that there is proper contact between the charging points in housing 104 and the charging points on left and right earbuds 300*a*, 300*b*. Additionally or alternatively, proper seating of the left and right earbuds 300*a*, 300*b* may be required to ensure that lid 102 can be fully closed. Fully closing lid 102 may ensure that the left and right earbuds 300*a*, 300*b* cannot fall out of the case during transport.

Figure 5B:
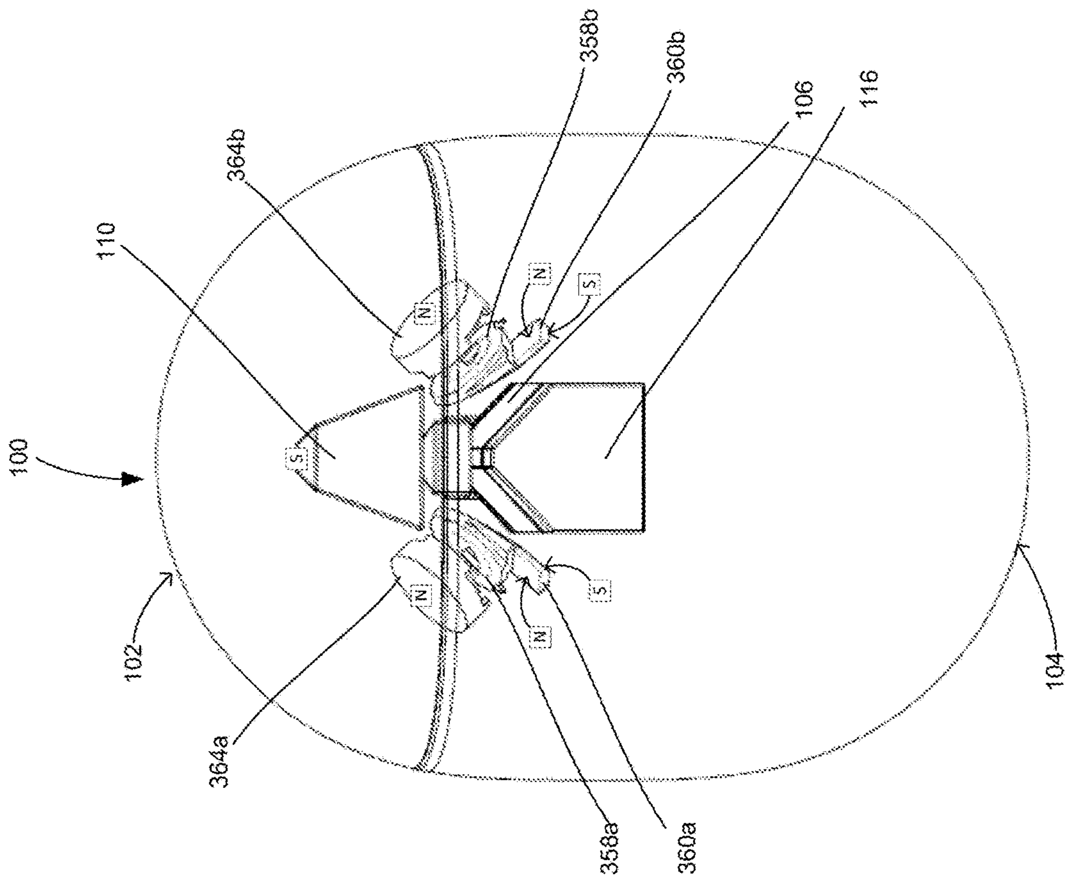
FIG. 5B is a perspective view of the example case of FIG. 5A housing an example accessory according to aspects of the disclosure.
Figure 5A:
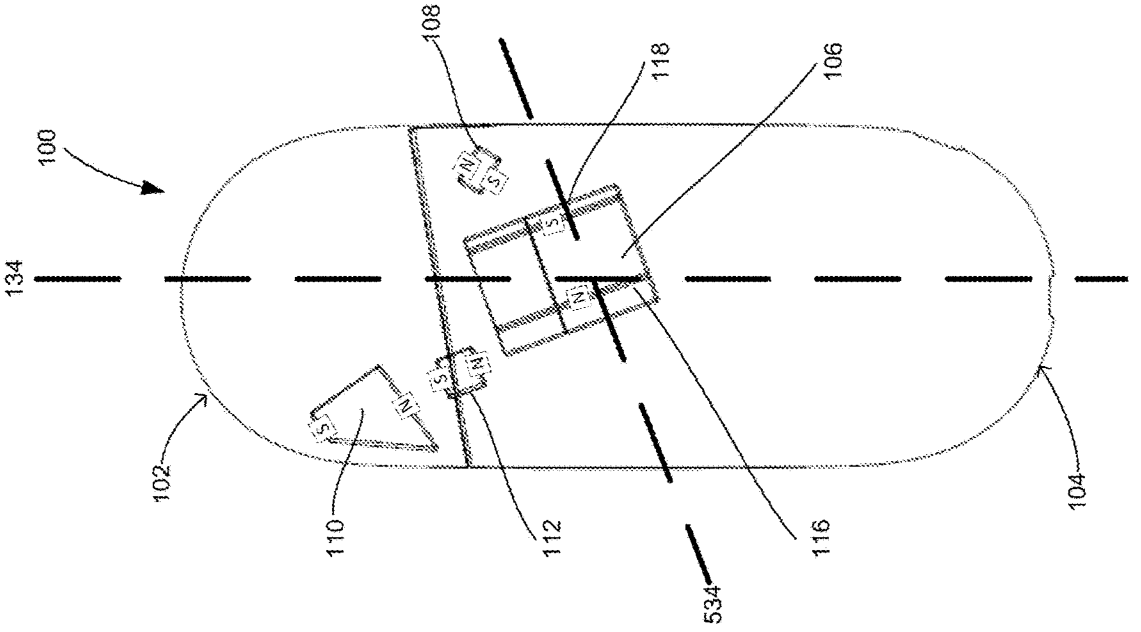
FIG. 5A is a perspective view of an example case for an electronic accessory according to aspects of the disclosure.

FIGS. 5A and 5B illustrate an example of the polarity of the magnets within case 100 and left and right earbuds 300*a*, 300*b*.

As shown in FIG. 5A, housing magnet 106 has a North and South pole. The North and South pole of housing magnet 106 is oriented such that the magnetic field of housing magnet 106 is transverse to the longitudinal axis 134 of case 100. According to some examples, the housing magnetic field may extend or radiate along or parallel to axis 534. Hinge magnet 108 may have a North and South pole and may be oriented such that the South pole of hinge magnet 108 is closest to or directed toward the South pole of housing magnet 106. Thus, hinge magnet 108 and housing magnet 106 may repel each other. The magnetic repulsion between hinge magnet 108 and housing magnet 106 may assist in creating the bi-stable magnetic field hinge.

Nest magnet 112 may be oriented such that the North pole is oriented to be closest to or directed towards the housing magnetic field and/or the North pole of housing magnet 106. Thus, the South pole of nest magnet 112 may be directed towards lid 102. Lid magnet 110 may be oriented such that the North pole of lid magnet 110 is closest to or directed towards the South pole of nest magnet 112. Thus, lid magnet 110 and nest magnet 112 may be magnetically attracted to one another.

As shown in FIG. 5B, basement magnets 360*a*, 360*b* may be oriented such that the South pole of basement magnets 360*a*, 360*b* is closest to or directed towards housing magnet 106 and/or the housing magnetic field. The South pole of basement magnet 360*a*, 360*b* may be magnetically attracted to housing magnet 106 and, therefore, the housing magnetic field. The magnetic attraction between housing magnet 106 and basement magnet 360*a*, 360*b* may assist in magnetically coupling the electronic accessory to housing 104. Speaker yoke 364*a*, 364*b* may be oriented such that the South pole of speaker yoke 364*a*, 364*b* is closest to or directed towards housing magnet 106 and/or the housing magnetic field. The South pole of speaker yoke 364*a*, 364*b* may be magnetically attracted to housing magnet 106 and, therefore, the housing magnetic field. The magnetic attraction between housing magnet 106 and speaker yoke 364*a*, 364*b* may assist in magnetically coupling the electronic accessory to housing 104.

The magnetic attraction between housing magnet 106 and basement magnet 360*a*, 360*b* may assist in magnetically coupling the electronic accessory to housing 104. Speaker yoke 364*a*, 364*b* may be oriented such that the South pole of speaker yoke 364*a*, 364*b* is closest to or directed towards housing magnet 106 and/or the housing magnetic field. The South pole of speaker yoke 364*a*, 364*b* may be magnetically attracted to housing magnet 106 and, therefore, the housing magnetic field. The magnetic attraction between housing magnet 106 and speaker yoke 364*a*, 364*b* may assist in magnetically coupling the electronic accessory to housing 104.

While the polarity of the magnetics is shown one way, the polarity may be reversed such that where the North pole is identified may be the South pole and where the South pole is identified may be the North pole. Thus, the polarities shown in FIGS. 5A and 5B are merely one example of the magnetic configuration and is not meant to be limiting.

Figure 6:
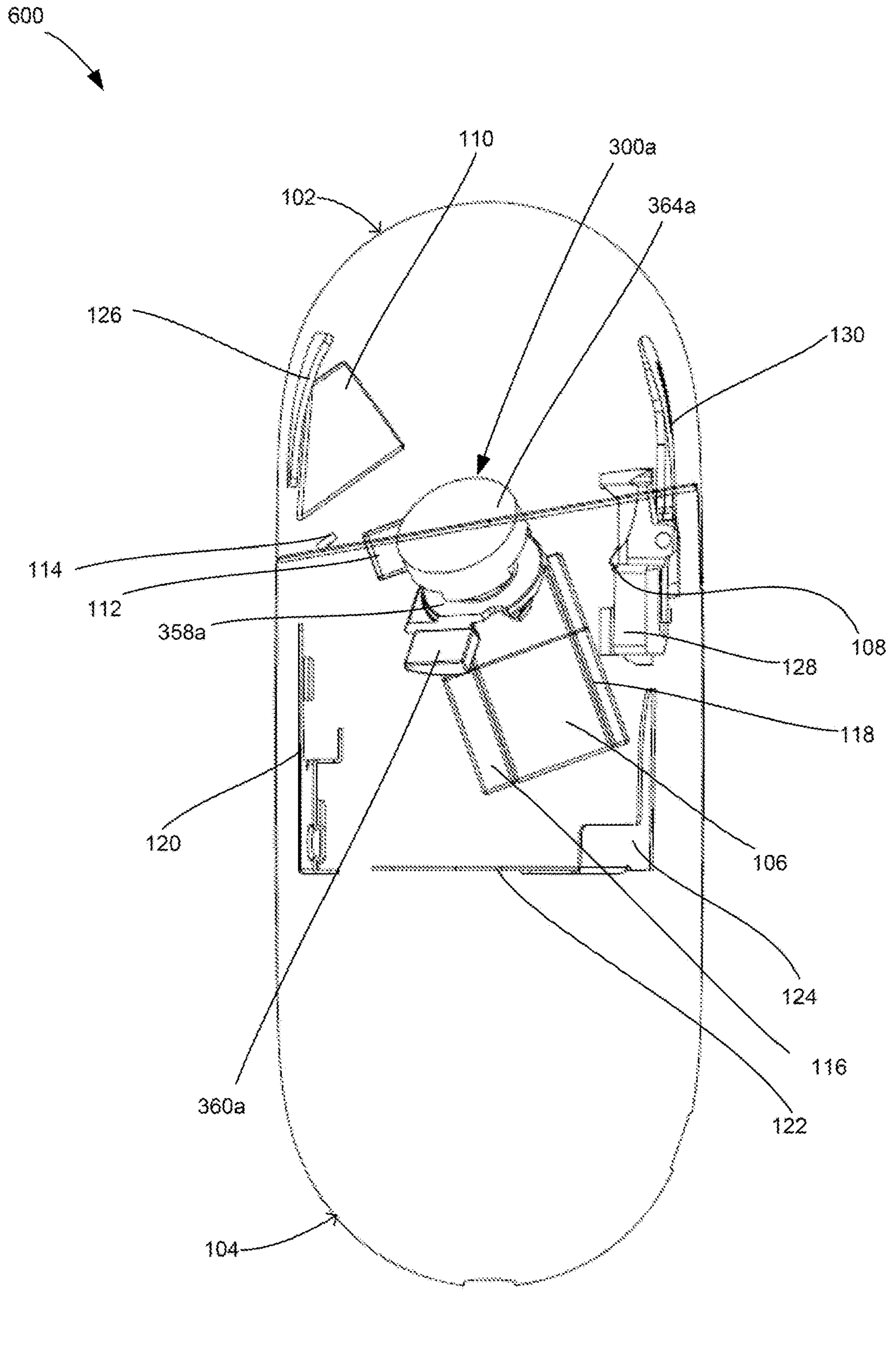
FIG. 6 is a side perspective view of an example electronic accessory within an example case according to aspects of the disclosure.

FIG. 6 illustrates a side view of a system including a case and an electronic accessory. The case may include a plurality of shunts and shields to reshape the magnetic field produced by the magnets within the case. The shunts and shields within the case may also reshape the magnetic field produced by the magnets within the electronic accessory when the electronic accessory is within the case. The size and location of the shunts and shields within the case may be determined by the size and location of the magnets within the case. Additionally or alternatively, the size and location of the shunts and shields may be based on the magnets within the electronic accessory when the electronic accessory is within the case.

As shown in FIG. 6, system 600 may include a case for receiving an electronic accessory, such as a pair of earbuds. Due to the orientation of the case, only the right earbud 300*a* is shown. In particular, only the basement magnet 360*b*, basement MIM part 358*b*, and speaker yoke 364*b* of the left earbud 300*b* is shown within the case.

As discussed above, housing magnet 106 is large enough to have a magnetic field strength to couple both the right earbud 300*a* and left earbud, not shown, to the case. Further, housing magnet 106 is large enough such that it has the magnetic field strength to also interact with hinge magnet 108 to create a bistable magnetic field hinge. Thus, only a single housing magnet 106 may perform many functions within system 500.

Within lid 102 and housing 104 may be a plurality of shunts and shields to redirect the magnetic fields of lid magnet 110, nest magnet 112, hinge magnet 108, housing magnet 106, basement magnet 360*b*, basement MIM part 358*b*, speaker magnet (not shown) and speaker yoke 364*b*. For example, lid shield 126 may redirect the magnetic field of lid magnet 110 such that the magnetic field does not extend outside lid 102. PCB shield 120 and coil shield 124 may be located at or near an inside surface of housing 104. PCB shield 120 and coil shield 124 may redirect the magnetic fields of the various magnets within the case to remain substantially within the case.

The use of shunts and shields allows for one large magnet, the housing magnet 106, to be within the case without damaging other components inside the case or any devices outside the case. Moreover, the use of a single housing magnet 106 for coupling the earbuds to housing 104 as well as interacting with hinge magnet 108 to create a bistable magnetic field hinge reduces the number of magnets required in the case.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed is:

1. A case, comprising:

a housing;

a lid coupled to a portion of the housing, the lid configured to rotate around an axis of rotation from a closed configuration in which the lid mates with the housing, through one or more intermediate positions, to an open configuration in which the lid ceases to mate with the housing;

a housing magnet located within the housing, the housing magnet having a first pole and a first magnetic field, the first pole having a first polarity;

a hinge magnet located near the axis of rotation for the lid and having a second pole and a second magnetic field, the second pole having a second polarity, the housing magnet, the hinge magnet, and the axis of rotation for the lid acting as a magnetic hinge, the magnetic hinge configured to enable the closed configuration through a first attraction or repulsion caused by the first and second magnetic fields and the open configuration through a second attraction or repulsion caused by the first and second magnetic fields and passing, through rotation around the axis of rotation, between the closed configuration and the open configuration and through the intermediate positions, the rotation around the axis of rotation through the intermediate positions dynamically transitioning between the first attraction or repulsion and the second attraction or repulsion; and a magnetic sensor configured to detect a first combined magnetic field when the lid is in the open configuration and a second combined magnetic field when the lid is in the closed configuration.

2. The case of claim 1, wherein the first and second combined magnetic fields are determined by the position of the lid magnet relative to the housing magnet in the open and closed configurations, respectively.

3. The case of claim 1, wherein the magnetic sensor is a Hall effect sensor.

4. The case of claim 1, further comprising circuitry for charging an electronic accessory housed in the case.

5. The case of claim 1, further comprising a lid magnet having a lid magnetic field and a nest magnet having a nest magnetic field, wherein the magnetic sensor detects the first combined magnetic field and the nest magnetic field when the lid is in an open configuration such that the magnetic sensor has a first saturation, and wherein the magnetic sensor detects the lid magnetic field when the lid is in the closed configuration such that the magnetic sensor has a second saturation different than the first saturation.

6. The case of claim 5, wherein the lid magnet is located within the lid and the nest magnet is located in the housing on a side opposite the hinge magnet, the lid magnet and the nest magnet being aligned along a longitudinal axis.

7. The case of claim 6, wherein the lid magnet and the nest magnet are attracted to each other when the lid is in the closed configuration.

8. The case of claim 1, further comprising a plurality of shields positioned within the housing and a plurality of shunts coupled to one or more magnets, the plurality of shields and the plurality of shunts configured to prevent a total magnetic field from extending substantially beyond the case.

9. The case of claim 8, wherein the plurality of shields and the plurality of shunts are further configured to prevent the total magnetic field from saturating a wireless charging coil located within the case.

10. The case of claim 8, wherein each of the plurality of shields and the plurality of shunts are made of ferrous metal.

11. The case of claim 1, wherein the first magnetic field exerts a magnetic force on an electronic accessory to magnetically couple the electronic accessory with the case.

12. A system comprising:

an electronic accessory; and a case including:

a housing including at least one cavity for receiving the electronic accessory;

a lid coupled to a portion of the housing, the lid configured to rotate around an axis of rotation from a closed configuration in which the lid mates with the housing through one or more intermediate positions, to an open configuration in which the lid ceases to mate with the housing;

a housing magnet located within the housing, the housing magnet having a first pole and a first magnetic field, the first pole having a first polarity; and a hinge magnet located near the axis of rotation for the lid and having a second pole and a second magnetic field, the second pole having a second polarity, the housing magnet, the hinge magnet, and the axis of rotation for the lid acting as a magnetic hinge, the magnetic hinge configured to enable the closed configuration through a first attraction or repulsion caused by the first and second magnetic fields and the open configuration through a second attraction or repulsion caused by the first and second magnetic fields and passing, through rotation around the axis of rotation, between the closed configuration and the open configuration and through the intermediate positions, the rotation around the axis of rotation through the intermediate positions dynamically transitioning between the first attraction or repulsion and the second attraction or repulsion.

13. The system of claim 12, further comprising a magnetic sensor configured to detect a first combined magnetic field when the lid is in the open configuration and a second combined magnetic field when the lid is in the closed configuration.

14. The system of claim 13, wherein the first and second combined magnetic fields are determined by the position of the lid magnet relative to the housing magnet in the open and closed configurations, respectively.

15. The system of claim 13, wherein the magnetic sensor is a Hall effect sensor.

16. The system of claim 12, the case further including circuitry for charging the electronic accessory.

17. The system of claim 12, further comprising a lid magnet located within the lid and a nest magnet located in the housing on a side opposite the hinge magnet, the lid magnet and nest magnet being aligned along a longitudinal axis.

18. The system of claim 17, wherein the lid magnet and the nest magnet are attracted to each other when the lid is in the closed configuration.

19. The system of claim 12, further comprising a plurality of shields positioned within the housing and a plurality of shunts coupled to one or more magnets, the plurality of shields and the plurality of shunts configured to prevent a total magnetic field from extending substantially beyond the case.

20. The system of claim 19, wherein the plurality of shields and the plurality of shunts are further configured to prevent the total magnetic field from saturating a ferrite sheet located within the case.

21. The system of claim 12, wherein the first magnetic field exerts a magnetic force on the electronic accessory to magnetically couple the electronic accessory with the case.

22. The system of claim 21, further comprising a house shunt coupled to the house magnet, the house shunt configured to at least shield the first magnetic field from extending substantially beyond the case or increase the magnetic attraction to the electronic accessory.

* * * * *